No. 661,436. Patented Nov. 6, 1900.
H. C. ATKINSON.
LINKING ATTACHMENT FOR SAUSAGE STUFFING MACHINES.
(Application filed June 30, 1900.)
(No Model.) 2 Sheets—Sheet 1.
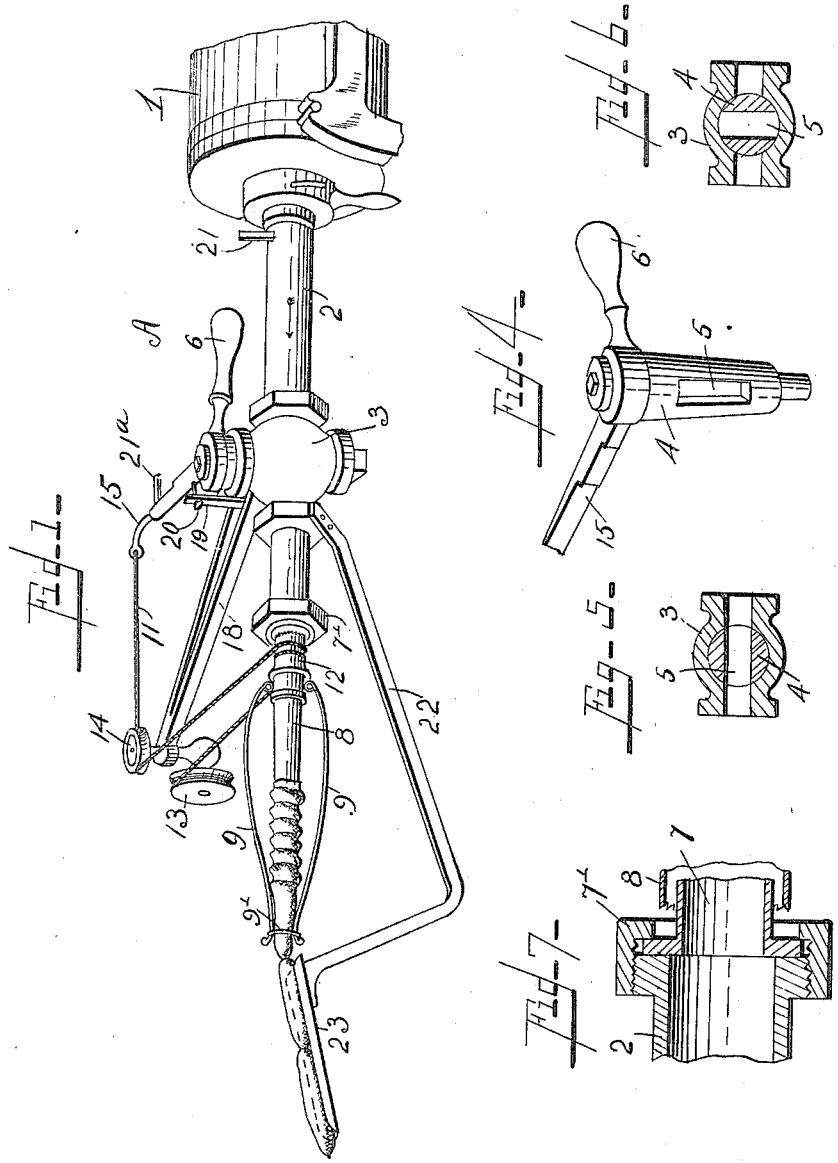
Witnesses
F. L. Ourand.
George J. Hebe.
Inventor
Henry C. Atkinson
By C. J. Stockman
Attorney
THE NORRIS PETERS CO., PHOTO-LITHO., WASHINGTON, D. C.

No. 661,436. Patented Nov. 6, 1900.
H. C. ATKINSON.
LINKING ATTACHMENT FOR SAUSAGE STUFFING MACHINES.
(Application filed June 30, 1900.)
(No Model.) 2 Sheets—Sheet 2.
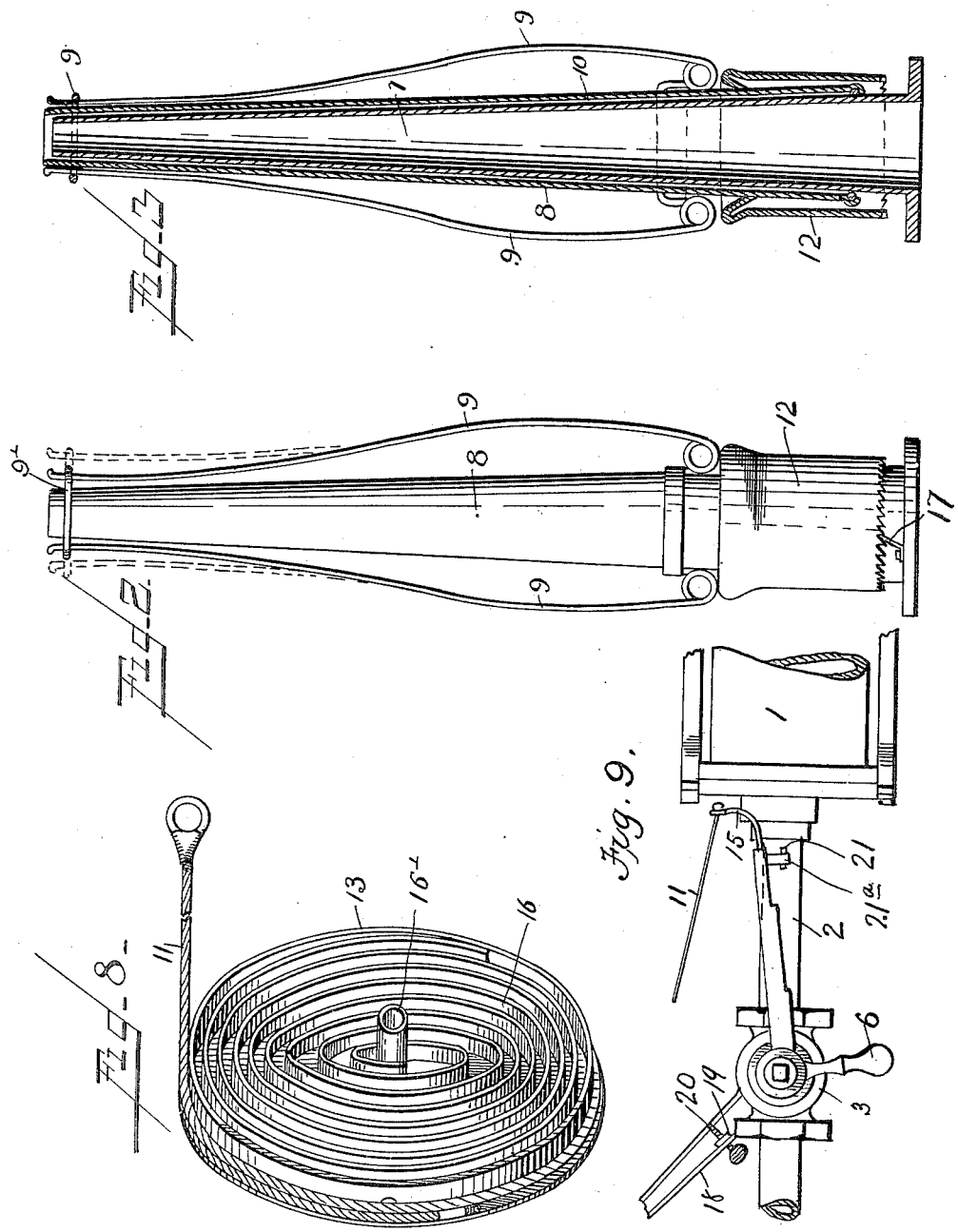
Witnesses
F. L. Durand
George J. Heber
Inventor
Henry C. Atkinson
By C. J. Stockman
Attorney

UNITED STATES PATENT OFFICE.

HENRY C. ATKINSON, OF LOUISVILLE, KENTUCKY, ASSIGNOR OF ONE-HALF TO MICHAEL REISSER, OF SAME PLACE.

LINKING ATTACHMENT FOR SAUSAGE-STUFFING MACHINES.

SPECIFICATION forming part of Letters Patent No. 661,436, dated November 6, 1900.

Application filed June 30, 1900. Serial No. 22,131. (No model.)

*To all whom it may concern:*

Be it known that I, HENRY C. ATKINSON, a citizen of the United States, residing at Louisville, in the county of Jefferson and State of Kentucky, have invented certain new and useful Improvements in Linking Attachments for Sausage-Stuffing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has general relationship with sausage-stuffing machines actuated by steam or other power, but it more especially relates to an attachment thereto whereby the casing-guts may be stuffed with sausage-meat and the sausages linked in the one machine.

The main object of the invention is to provide a means which applied to a sausage-stuffing machine will enable the casings to be filled and linked alternately—that is to say, will twist the casing and thereby form a link immediately upon the completion of the stuffing of a length of casing desired for a sausage.

In a copending application filed by me December 14, 1899, and serially numbered 740,258, I have shown, described, and claimed generically a linking attachment to sausage-stuffing machines having the same or substantially the same principle of operation and many of the features of detail construction embodied in the present invention. In said application there is also shown, described, and claimed more or less specifically a hand-operated sausage-stuffing machine having a linking attachment applied thereto.

The present invention is preferably similar to that of the copending application, modified in construction, however, to adapt it specially for use as a part of a sausage-machine in which the meat-feeding devices are actuated by steam or other power instead of by hand.

The invention consists, broadly, in the combination, with a sausage-stuffing machine having a valve actuable to control the flow of meat into the sausage-casing, of a rotative casing-holder and connections between said casing-holder and valve whereby the holder will be rotated to form a link-twist in the casing simultaneously with the turning of the valve to shut off the supply of meat to the casing.

The invention also consists in certain other novel combinations of elements, substantially as hereinafter described and particularly pointed out in the subjoined claims.

In the accompanying drawings, illustrating the preferred embodiment of the invention, Figure 1 is a perspective view indicating a steam-actuated sausage-stuffing machine equipped with my linking attachment therefor. Fig. 2 is a side elevation, and Fig. 3 a vertical section, of the casing-holder. Fig. 4 is a detail view of the valve which controls the supply of meat to the casing. Fig. 5 is a detail sectional view showing the position of the valve when the casing-holder is stationary, and Fig. 6 is a similar view of the valve in the position it occupies during the linking operation. Fig. 7 is a detail sectional view through the place of connection of the linking attachment with the feed-tube. Fig. 8 is a detail view of the spring-barrel; and Fig. 9 is a plan view of a portion of the device, showing the position of the parts when a casing-gut is being placed on the linker.

The same reference characters designate the same parts in the several views.

A designates a sausage-machine including a cylinder 1, a feed-tube 2, secured thereto by a lock-nut 2', and suitable steam or other power actuated means for feeding meat from the cylinder into said tube and through the same into the casing-gut when the passage through the tube is open. The specific meat-feeding means proper form no part of the invention and may be any of those well-known in the art or any others suitable for the purpose. For this reason it is not deemed necessary to illustrate any particular form herein.

The tube 2 is made in two sections, and between the confronting ends of said sections is located a valve-casing 3, within which is a valve 4, having an opening 5 through it. This valve constitutes a part of the meat-feeding means and is actuable to open or close the passage through which the meat flows to the casing-gut. It is preferably provided with a handle 6 at its upper end.

Connected with the discharge end of the tube 2 is the linking device proper, which includes a rotative casing-holding part and connections between the same and said valve, whereby it is rotated when the valve is turned to shut off the supply of meat to the casing-gut. The linking device herein shown consists of a stationary tube 7, secured to the feed-tube preferably by a hollow screw-nut 7', and a rotative casing-holding tube 8, mounted on said tube 7 and having a yielding clamping means comprising spring-arms 9, secured at their rear ends to the tube 8 and having their front ends engaged by a resilient ring 9', preferably of rubber, at the mouth of said tube 8. A space 10 is left between the tubes 7 and 8 for the escape of air. This part of the linking attachment preferred for the power-actuated machine is identical with that embodied in my pending application above referred to, and in common with the other structure it is preferred to utilize a flexible connection, such as the cord 11, between it and the reciprocable member or controlling device of the meat-feeding means, which reciprocable member in the present device is the valve 4. Said cord extends around a spool 12, formed on the tube 8, from a spring-barrel 13, thence over a pulley 14, and to the end of an arm 15, fixedly connected with the plug or valve 4, so that when the plug is turned from the position shown in Fig. 1, in which position its opening 5 is in registry with the openings through the two sections of the feed-tube 2 in the direction of the arrow, the cord will be pulled and the rotative casing-holder caused to turn thereby, and at the same time the supply of meat to the linker is shut off by the closing of the passage through said tube-sections. It will be seen that during the stuffing step of the operation of forming a sausage the clamp on the casing-holder will impose on the casing sufficient pressure to hold the same taut on the holder, but not sufficient to prevent it from feeding therefrom automatically by the pressure of inflowing meat, and that when the tube 8 is rotated rapidly the unattached ends of the long and slender spring-arms 9 tend to spread apart, and in so spreading they appreciably tighten the pressure of the rubber band 9' upon the casing-gut, thus assuring the formation of a link-twist at the end of the stuffed section of sausage.

The spring 16 in the barrel 15 is secured at one end to the stationary shaft 16' of the barrel and has its other end attached to the inner wall of said barrel, and said spring acts in opposition to the pulling force exerted by the operator and constitutes a returning means which restores the cord and barrel to their original position when said force is released. In order to prevent backward rotation of the casing-holder by said return of the cord, the use of a pawl and ratchet (indicated at 17) is preferably resorted to.

The spring-barrel 13 and pulley 14 hereinabove referred to are preferably supported in proper relative positions by the end of an arm 18, which projects from the valve-casing 3.

It is desirable to stop the rotation of the casing-holder at a suitable time, and for this purpose a projection 19 from the arm 18 is preferably employed, said projection being located in the path of the arm 15 and having an adjustable screw 20, which may be adjusted to determine the forward movement of the arm 15 at the exact limit best suited for the particular machine to which the improvement is applied. Situated at a suitable place (preferably on the tube 2, as shown) is a projection 21, into engagement with which the arm 15 (or preferably a catch $21^a$ on said arm, as shown) is brought when it is desired to supply the linker with a casing-gut to take the place of one that has been stuffed and filled. It will be apparent that by this means the valve will be held in closed position and both hands of the operator will be free to insert the new casing upon the tube 8.

Projecting from a suitable place is an arm 22, at the outer end of which is supported a trough 23, which is located contiguous to the free end of the linker and constitutes a rest for the sausages being formed.

From the above description the operation of the device will readily be understood to be as follows: Meat under pressure from the steam or other power passes into and through the tube 2 and the linker-tube 7 and into the sausage-casing. When enough meat has passed into the casing to form a sausage-link of the desired length, the operator pulls the handle 6 toward him, thus moving the arm 15 and tightening and pulling the cord 11 and causing the outer tube 8 to revolve. The same movement of said handle turns the valve 4, thereby cutting off the passage of meat through the feed-tube until the link-twist is formed. As soon as the operator releases pressure on the handle the spring in the barrel restores the several parts to their respective former positions and the stuffing operation is resumed to fill the section of casing immediately rearward of that which has been stuffed and linked. These operations of alternately stuffing and linking are continued until the gut on the linker has been filled, after which the arm 15 is brought into engagement with and held by the catch 21 until a new gut or casing has been properly placed upon the rotative holder 8 therefor between the outer wall of the tube 8 and the clamping-arms 9 and ring 9'.

Having thus described the invention, what I believe to be new, and desire to secure by Letters Patent, is—

1. The combination with a sausage-stuffing machine, having meat-feeding means comprehending a valve actuable to control the supply of meat to the sausage-casing, of a rotatable holder for said casing, and connections between said valve and holder by which the holder is rotated to form a link-twist in the casing simultaneously with the turning of the valve to shut off the supply of meat to the casing.

2. A linking attachment to sausage-stuffing machines, having, in combination a rotatable holder for the sausage-casing, a reciprocable valve for controlling the supply of meat to the casing, connections between said holder and valve by which the holder is rotated when the valve is turned in one direction, and means by which the holder is held against rotation when the valve is turned in the opposite direction.

3. The combination with a sausage-stuffing machine, having meat-feeding means comprehending a valve actuable to control the supply of meat to the sausage-casing, of a rotatable holder for said casing, a flexible connecting means between said holder and valve, a returning means for said flexible connecting means, and devices for preventing backward rotation of the casing-holder by the return of said connecting means.

4. The combination with a sausage-stuffing machine, having meat-feeding means comprehending a valve actuable to control the supply of meat to the sausage-casing, of a rotatable tube for supporting said casing, said tube having a yielding clamping means, means for preventing backward rotation of the tube, a cord extending around said tube and having one end connected with said valve, and a spring-barrel to which the other end of said cord is attached.

5. The herein-described attachment to sausage-stuffing machines, comprising a feed-tube, a rotatable casing-holder for holding the gut open to access of sausage-meat thereinto, a reciprocable valve having an opening through which the meat passes into the casing, a handle for operating said valve, an arm projecting from said valve, a second arm, a spring-barrel and a pulley both supported by said second arm, a cord having one end attached to said spring-barrel and its other end attached to the first-mentioned arm, said cord extending around said casing-holder and pulley, and a pawl and ratchet for preventing backward rotation of the casing-holder.

6. The herein-described attachment to sausage-stuffing machines, comprising a feed-tube, a linker connected therewith and embodying an inner tube, an outer tube rotatable on the inner tube and a yielding clamping means on the outer tube, said linker having a pawl and ratchet for preventing backward rotation of the outer tube, a valve having an opening through which meat passes into the inner tube of the linker, a handle and an arm projecting from said valve, a cord extending around the outer tube of the linker and having one end attached to said arm, and a returning means to which the other end of said cord is attached.

7. The herein-described attachment to sausage-stuffing machines, comprising a feed-tube, a rotatable casing-holder, a reciprocable valve for controlling the supply of meat to the casing, an arm connected with said valve and partaking of the movements thereof, a cord attached at one end to said arm and extending around said casing-holder, a returning means to which the other end of said cord is attached, means for preventing backward rotation of the casing-holder, and a catch to engage said arm and lock the valve in closed position while a casing is being placed on said holder.

8. A linking attachment to sausage-stuffing machines, comprising a rotatable casing-holder, a reciprocable valve actuable to control the supply of meat to the casing, a cord having one end connected with the valve, a spring-controlled returning means to which the other end of said cord is attached, said cord extending around the casing-holder and being operated to rotate the same when the valve is turned to shut off the supply of meat to the casing, means for preventing backward rotation of the casing-holder, a stop for limiting the movement of the valve in one direction, and a locking means for holding the valve in closed position during the imposition of a casing upon said holder.

9. A linking attachment to sausage-stuffing machines, having, in combination, a rotatable holder for the sausage-casing, a valve for controlling the supply of meat to the casing, connections between said holder and valve by which the holder is rotated when the valve is turned in one direction, and a rest supported at the mouth of said holder, for supporting the sausage as it is stuffed and until it has been linked.

In testimony whereof I affix my signature in presence of two witnesses.

HENRY C. ATKINSON.

Witnesses:
J. O'DONNELL,
A. E. WALESBY.